March 3, 1964
M. R. OVERBYE
3,122,897
FREEZING TUNNEL FOR COMESTIBLES
Filed March 5, 1962
6 Sheets-Sheet 1
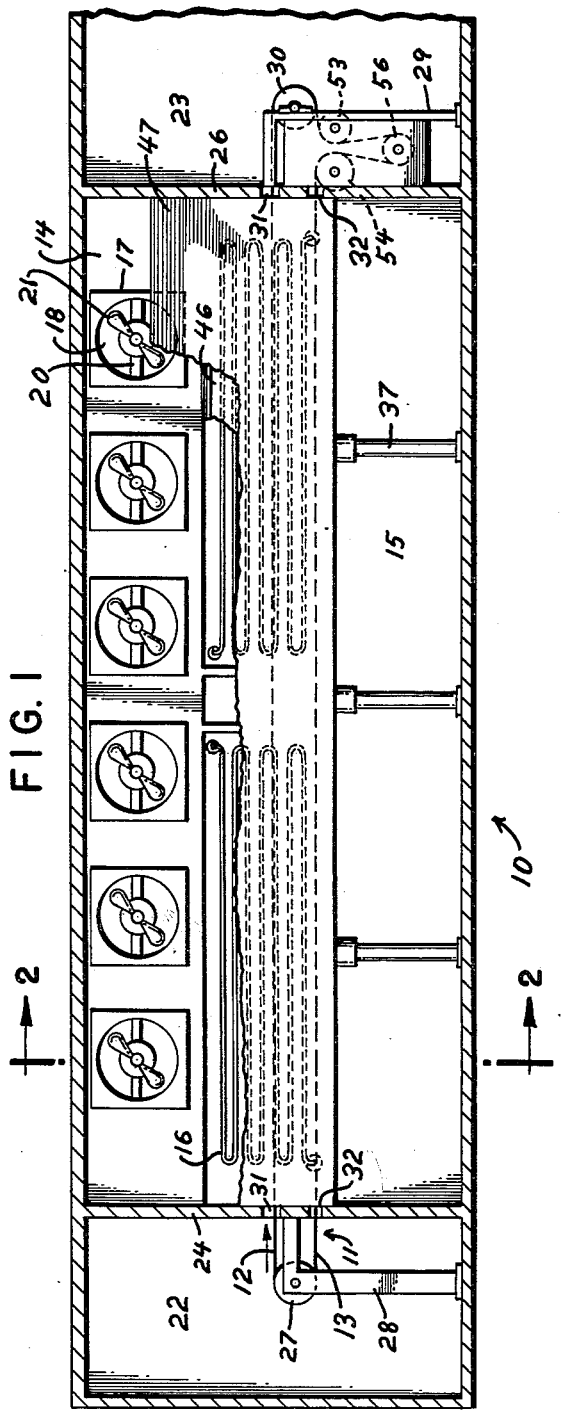
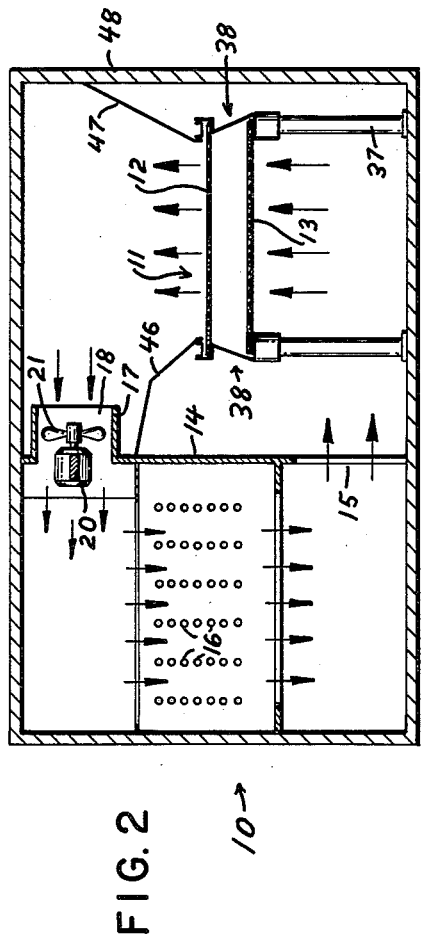
INVENTOR.
MILAN R. OVERBYE
BY
ATTORNEYS

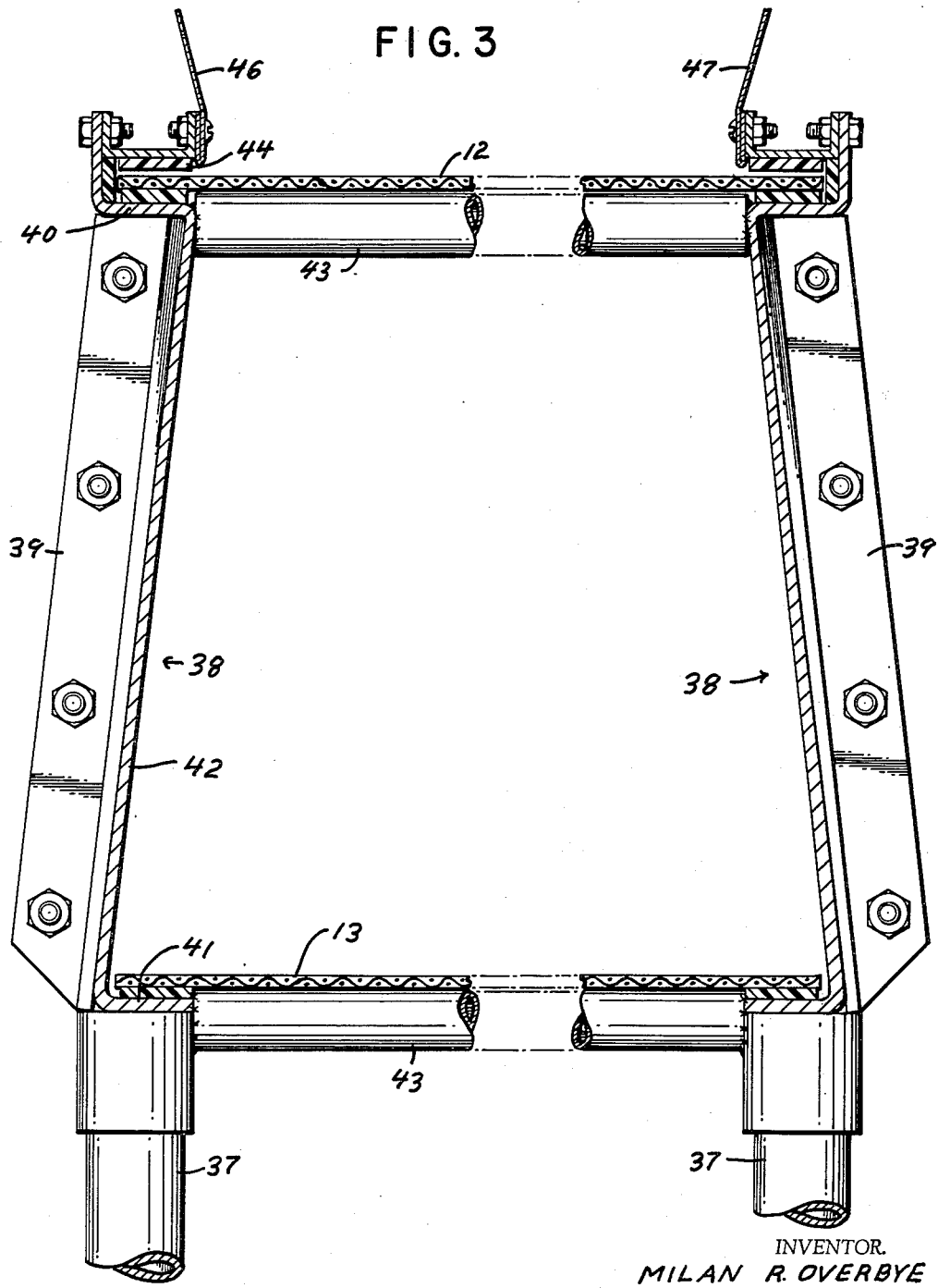

March 3, 1964 M. R. OVERBYE 3,122,897
FREEZING TUNNEL FOR COMESTIBLES
Filed March 5, 1962 6 Sheets-Sheet 3
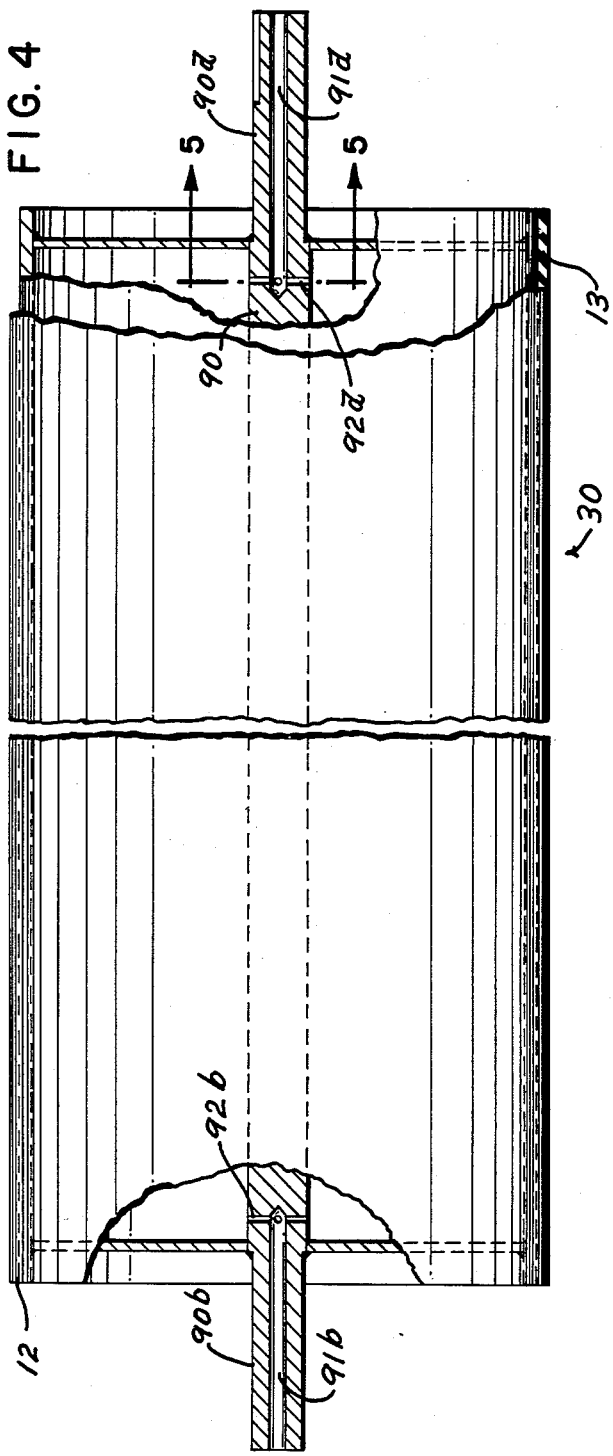
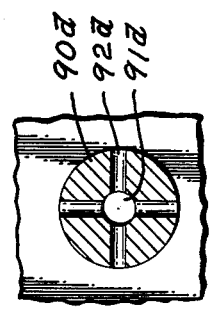
INVENTOR.
MILAN R. OVERBYE
BY Barnes + Seed
ATTORNEYS March 3, 1964 M. R. OVERBYE 3,122,897
FREEZING TUNNEL FOR COMESTIBLES
Filed March 5, 1962 6 Sheets-Sheet 4

INVENTOR.
MILAN R. OVERBYE
BY Barnes + Seed
ATTORNEYS

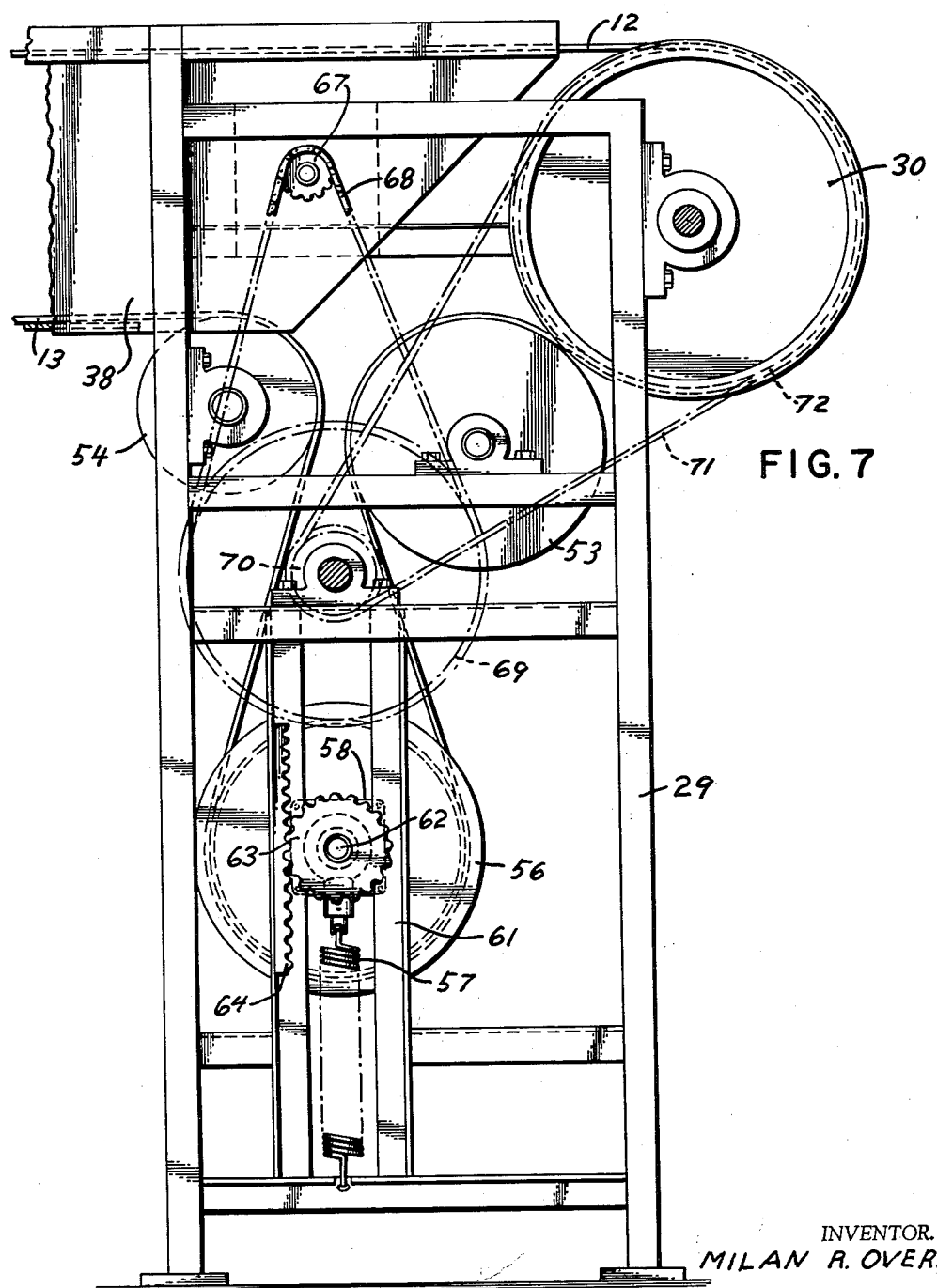

March 3, 1964   M. R. OVERBYE   3,122,897
FREEZING TUNNEL FOR COMESTIBLES
Filed March 5, 1962   6 Sheets-Sheet 6

INVENTOR.
MILAN R. OVERBYE
BY Barnes & Seed
ATTORNEYS

United States Patent Office 3,122,897
Patented Mar. 3, 1964

3,122,897
FREEZING TUNNEL FOR COMESTIBLES
Milan R. Overbye, Seattle, Wash., assignor to Lewis Refrigeration Co., Seattle, Wash., a corporation of Washington
Filed Mar. 5, 1962, Ser. No. 177,337
12 Claims. (Cl. 62—275)

This invention relates generally to refrigerating apparatus and more particularly to apparatus used in the freezing of comestibles such as peas, corn, strawberries and the like.

It is desirable to freeze such comestibles in a manner that each particle is separate and free of the others, with a thin coat of frozen surface moisture enveloping each particle. In such a state the comestibles are easily packaged, and the ultimate consumer can with no difficulty unpackage the comestibles or pour the desired portion from the package. Also, by so freezing the comestibles, it is easier to insure that the proper moisture content of the comestibles is preserved and that each particle is frozen throughout.

In a patent to Sterling No. 2,223,972, there is disclosed a basic approach to this problem of properly freezing comestibles. In the apparatus of this patent, the comestibles are carried on a wire mesh conveyor which has refrigerating coils located between the upper and the lower run of the conveyor. Air is blown through the refrigerating coils and upwardly through the upper run of the conveyor, which causes the comestibles (in the words of the patent disclosure) "to float or remain in suspension a slight distance above the conveyor," so that the comestibles tend to freeze as separate particles. The entire apparatus is enclosed in several insulated compartments.

One difficulty encountered in the operation of a tunnel of this general type is caused by the evaporation of surface moisture from the comestibles and the condensation of this and other moisture as ice within the tunnel. Because of this the tunnel must periodically be shut down for "defrosting" or cleaning. Beyond this, however, the icing can cause considerable trouble with both the conveyor and its associated drive mechanism. The conveyor itself must have openings in sufficient number and size to allow the proper flow of air therethrough to create the desired suspending action of the comestibles, and yet must have its openings small enough so that it can carry the comestibles having smaller particle size such as corn or peas. Accumulation of ice can cause these openings to become clogged so that the food particles tend to freeze together in clumps.

With regard to the icing problem affecting the drive mechanism, even a chain and sprocket drive can become jammed with ice so that the mating parts will not properly engage. However, it is with driving means that depend upon frictional engagement of the belt for the transmission of power (which is generally a simpler and more practical arrangement) that icing is particularly troublesome, since even a very small amount of icing will reduce the coefficient of friction to such a level that the frictionally engaging parts will slip.

Another important consideration is the ability to make fine adjustments in the operating characteristics of the tunnel. The same apparatus will most probably be required at different times to process, for example, peas, then corn, etc. Since some comestibles comprise particles of a size, density, etc., quite different from others to be frozen, and since the desired rate of output will also vary, certain functional portions of the apparatus must be able to be adjusted. For practical reasons, the length of the conveyor run remains constant, so that time of exposure within the freezing zone of the tunnel is best adjusted through controlling the speed of the belt. It has been found that it is most practical to use a hydraulic drive for the conveyor mechanism, and to control the flow to the hydraulic motor to obtain the desired accuracy of control of the conveyor speed.

It is also a matter of concern that there is a proper flow of air through the upper conveyor run, with the turbulence being at a minimum and the lifting force exerted on the comestibles being for the most part uniform over the entire area of the belt. If there is excessive pressure in a localized area, there is a tendency for what was formerly a uniform blanket of suspended particles to "erupt" or "blow through," leaving pockets similar to miniature volcanic cones with the food particles being blown aside and the air beneath the conveyor funneling through the resulting holes relatively unobstructed. A pressure reduction occurs near each of such pockets, with the food particles adjacent the "blow-out" freezing into clumps.

Along with these aforementioned problems, there is, considering the rather substantial cost of building such a tunnel, the overall consideration of the need to economize on, and simplify, the structure and apparatus required, without diminishing the performance characteristics of the tunnel.

Thus it is a general object of this invention to provide a relatively simple and economical freezing tunnel which maintains a high output of properly frozen comestibles, which is well able to handle a variety of comestibles under varying conditions, and in which bad effects of icing within the tunnel is at a minimum.

More specifically it is an object to provide a practical and simple conveying apparatus having a conveyor belt frictionally engaging a live roller and having a hydraulic drive with a very convenient control apparatus all of which cooperate to aid in producing the benefits recited in the aforementioned general object.

It is also an object to provide a frame for said conveyor and also to provide an overall tunnel configuration, both of which also contribute to produce the abovementioned benefits.

Other more particular objects and advantages will appear and be understood in the course of the following description and claims, the invention consisting in the novel construction and in the adaptation and combination of parts hereinafter described and claimed.

In the accompanying drawings:

FIGURE 1 is a longitudinal sectional view of a freezing tunnel embodying preferred teachings of my invention;

FIGURE 2 is a transverse sectional view thereof;

FIGURE 3 is fragmentary transverse sectional view of the conveyor of my freezing tunnel;

FIGURE 4 is a fragmentary longitudinal view, partly in section, of a live roller used in the conveying apparatus of my invention;

FIGURE 5 is a sectional view, drawn to an enlarged scale, and taken on line 5—5 of FIG. 4;

FIGURE 6 is a schematic drawing illustrating the hydraulic drive mechanism for said live roller;

FIGURE 7 is a side elevational view showing in full lines the tensioning apparatus for said conveyor belt, and showing in broken lines the chain-and-sprocket which drives the live roller.

Figure 8:
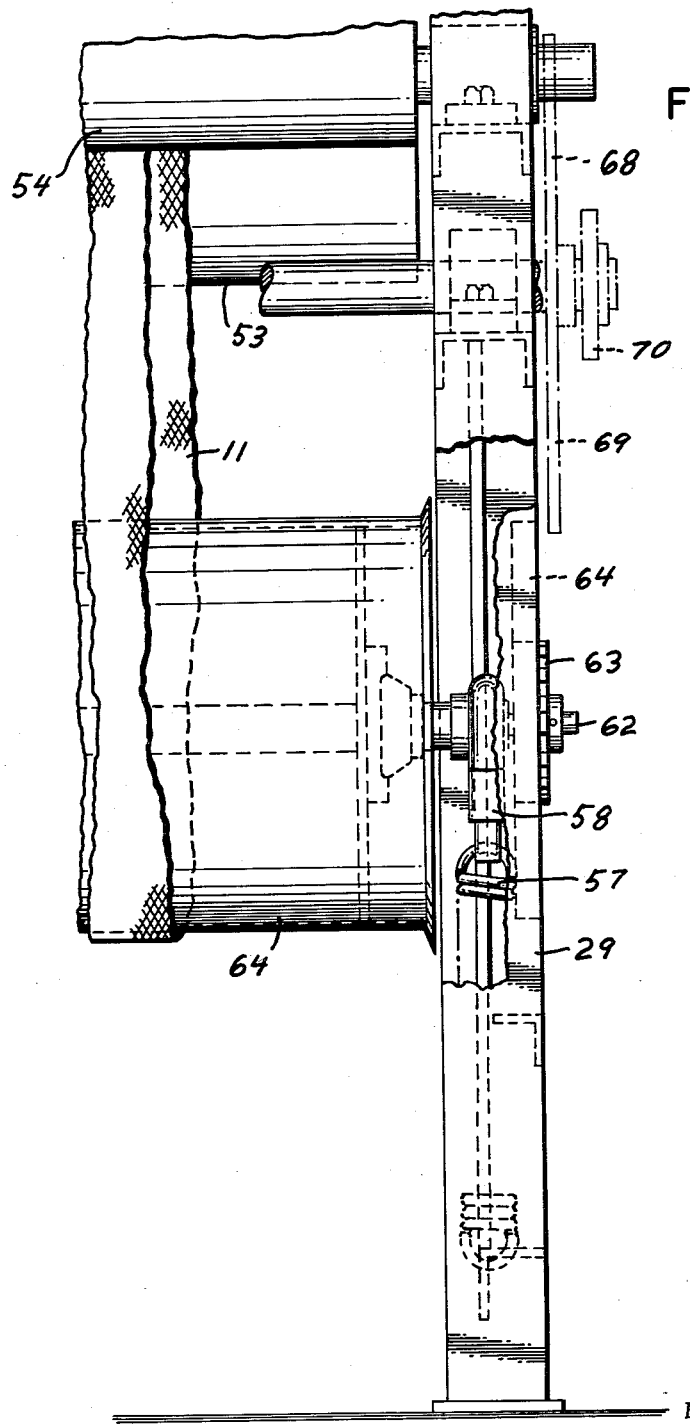
FIGURE 8 is a fragmentary front elevational vew of a portion of the tensioning apparatus and drive mechanism for said conveyor belt.

Referring to the accompanying drawings, numeral 10 designates a freezing tunnel having substantial length and being in transverse section of a generally uniform rectangular shape. To carry comestibles through the tunnel, there is provided a foraminous conveyor 11 (desirably made of wire mesh) extending the length of the tunnel and having an upper and lower run 12 and 13, respectively. The tunnel is partitioned by a longitudinal vertical wall 14 that depends from the ceiling of the tunnel and extends along the approximate center line thereof. The conveyor is located (as viewed in rear elevation) to the right of this wall, at the tunnel's approximate mid-height, while to the left of the partition wall also at about mid-height of the tunnel and extending substantially the entire length thereof, is a plurality of refrigerating coils 16.

The lower edge of the partition wall is spaced from the tunnel floor to form a large lower opening 15 extending the length of the tunnel, through which opening air may pass freely from below the refrigerating coils to beneath the conveyor belt. Along the length of the upper portion of the partition wall are several evenly spaced box-like housing structures 17, each of which defines one of a number of horizontal transverse through-openings 18, in each of which is mounted by suitable struts 20 one of an equal number of circulating fans 21. Each of these fans rotates on a transverse horizontal axis so as to draw air from above conveyor 11, the effect of this being to circulate the air in a direction which (as viewed in rear elevation) is generally counter-clockwise, with the air thus passing downwardly through the refrigerating coils 16 and upwardly through the conveyor 11.

There is a loading chamber 22 at the rear of the tunnel and at the front thereof is a discharge chamber 23. Each of these chambers is separated from the tunnel by a related one of two transverse bulkheads 24 and 26, one closing the rear end and the other the front end of the tunnel. The rear of the conveyor belt reaches into the loading chamber 22 where it curves in a 180° arc to train over an idler roller 27 that is carried in said chamber by a suitable supporting frame 28. The front end of the conveyor extends into the discharge chamber 23, where it frictionally engages in a similar 180° arc a live roller 30 that is carried by a suitable frame 29. Upper and lower horizontal slot openings 31 and 32 are provided in each of the bulkheads 24 and 26 to permit the travel therethrough of, respectively, the upper and lower conveyor runs 12 and 13.

The supporting structure for the upper and lower runs 12 and 13 within the tunnel comprises several columns 37 which carry two longitudinal frame sections 38, located on opposite sides of the belt. These frame sections are, in transverse section, of a Z configuration, the upper and lower flange portions 40 and 41 of the Z carrying, respectively, the upper and lower belt runs 12 and 13, and the web portion 42 of each frame reaching from the outer edge of the lower flange to the inner edge of the upper flange. Beneath each conveyor run, and providing vertical support therefor, is a plurality of suitably arranged crossbars 43, reaching between the Z frames. The upper flanges 40 of the frame sections are each formed with a cover piece 44 which defines with its related flange one of two opposed channels to receive in tracking relationship a related edge of the upper conveyor run 12. Suitable stiffening members 39 are connected to the outer surface of each of the Z-sections at regular intervals along the length thereof.

Diverging upwardly from each of these channels 44 is one of two longitudinal side walls 46 and 47 which define a large trough, having the upper conveyor run 12 as its base. The upper edges of these walls reach, one to the partition wall 14, and the other to the adjacent side wall 48 of the tunnel. This trough arrangement serves to return to the belt any food particles which may be blown off the belt, and also to block the air from the refrigerating coils 16 so that such air is directed upwardly through both conveyor runs 12 and 13.

To keep the conveyor belt properly taut, there are provided two longitudinally spaced rollers 53 and 54, located a short distance behind the live roller 30 with the upper surface of each being generally tangent to the plane of the lower belt run 13. Located below said guide rollers and on a transverse plane therebetween is a tension roller 56 which is pressed downwardly by means of two tension springs 57. This is accomplished by securing the lower end of each spring to the frame 29 and securing each upper spring end to a related one of two bearing blocks 58 located on opposite sides of the tension roller and mounted each in a related one of two parallel vertical slideways 61 that are rigid with the frame 29. The tension roller 56 is journal mounted on a shaft 62, which in turn is journal mounted in the bearing blocks 58. Rigidly attached to each end of the shaft 62 is a related one of two spur gears 63. Each of these gears meshes with an associated gear rack 64, positioned parallel to its related slideway 61 and rigidly secured thereto. Thus each end of the shaft 62 must travel an equal distance along its related rack so that the angular position of the shaft and consequently the angular position of the roller 56 is always the same. As the lower run of the conveyor leaves the live roller 30, it trains over the front guide roller 53, thence downwardly and around the lower tension roller 56, and then upwardly over the rear guide roller 54, wherefrom it continues rearwardly on the path of the lower belt run.

To turn the live roller 30, there is provided a hydraulic motor 66, which, through a speed-reducing chain and sprocket transmission 67–71, engages a sprocket 72 rigidly secured to one side of said live roller. More specifically the operation of this transmission comprises a small sprocket wheel 67 which is turned by the hydraulic motor and which connects through a chain 68 to a larger sprocket 69 that is rigidly secured to and is concentric with a second smaller sprocket 70, which through a second chain 71 turns the sprocket 72.

To describe the hydraulic drive for the motor 66, there is a pump 75 which draws fluid from a reservoir 76 to deliver a constant flow of fluid to a valve 78 through a line 77. (Pressure in line 77 may be determined by means of a suitable gauge such as that shown at 80.) This valve 78 may be any one of a number of standard hydraulic valves and operates to direct the flow to either a power line 81 or to by-pass line 82, each of which lines, for clarity of description, will be described as comprising three sections, designated respectively as 81a, 81b and 81c, and 82a, 82b and 82c. If desired, this valve 78 may be arranged to operate in a manner to control precisely an apportionment of flow to the lines 81a and 82a in the desired ratio, but normally the valve functions to direct the entire flow to either line 81a or 82a.

The power line portion 81a leads to a conventional flow control valve 83, whose primary function is to determine the proper amount of fluid to be delivered to the power line at 81b. Of the fluid received from line 81a, that which is not delivered to line 81b is directed to the by-pass line portion 82b. This valve 83 is provided with a relief line 84 also leading to the by-pass line 82b. The power line 81b then leads to a shut-off valve 86 which functions in the same manner as valve 78. The power line portion 81c extending from the valve 86 leads to the hydraulic motor 66, while the by-pass port from this valve joins the by-pass line portion 82c which in turn leads to a rotary union 87 that is secured to one end of the live roller 30. Fluid from the hydraulic motor 66 is directed by a line 88 also to this union 87. For convenience of operation, the valves 83 and 86 are located in the discharge chamber 23, while the valve 78 is ordinarily outside this chamber.

Referring now specifically to FIGURES 4 and 5, the live roller 30 is formed as a hollow cylinder having an axial rod 90 which extends beyond each end of the cylinder to form two trunnion members 90a and 90b by which the roller is mounted in suitable bearings. Each of these trunnion members has an axial opening 91a and 91b, each of which at its inner end communicates with the interior of the roller at opposite ends thereof by means of radial openings 92a and 92b in the rod 90. One of the trunnion members connects to the aforementioned union 87, while the other connects to a return line 93 leading back to the fluid reservoir 76. Thus fluid is able to pass through the union 87, through openings 91a and 92a into the interior of the roller 30, and thence out to the return line 93 through openings 92b and 91b.

In operation, the comestibles are either manually or mechanically loaded onto the rear portion of the upper conveyor run 12, the rate of loading being consistent with the overall capacity of the apparatus. The speed of the fans 21, circulating the air in the tunnel in the aforedescribed counter-clockwise direction, i.e. down through the refrigerating coils and upwardly through the conveyor 11, is adjusted in relation to the type of comestibles in the tunnel, to the depth of loading on the belt, etc. To explain this latter statement more fully, the force exerted by the rising air should be just sufficient to create what can be appropriately termed a "dense-phase suspension" of the comestibles. That is to say, the comestible particles are just suspended over the belt, with the particles being fairly close to one another. There is little turbulence, and the particles form a fairly uniform blanket which exhibits a slight rippling or wave action suggestive of mild wave action of a liquid surface.

With respect to the particular manner in which the air is circulated in the tunnel, the air follows a generally rectangular path in a transverse plane, the path being parallel to the containing walls of the tunnel. As the circulating air reaches the corner areas of this rectangular path, its velocity head is partially transformed into pressure head, i.e. it experiences a decrease in velocity and an increase in pressure. The effect of this is that after the air moves laterally through the lower tunnel opening 15 and thence begins its upward travel toward the conveyor, the air passes through the lower conveyor run 13 to be contained by the Z frames 38 so as to flow in a relatively non-turbulent manner through the upper conveyor run 12, with the velocity of the air being fairly uniform over the entire area of the belt.

The speed of the conveyor depends upon several factors, such as, the depth of loading on the belt, the type of comestibles being frozen, the condition and temperature of the comestibles as they are being loaded, etc. The valves 78 and 86 are customarily used merely as shut off valves, thus allowing an operator to halt the conveyor from either within or without the discharge chamber 23. The conveyor speed is precisely controlled by means of the flow control valve 83, the location of this valve being such that the operator can observe the condition of the comestibles coming off the conveyor and make the desired adjustments during a run of a particular comestible.

With respect to the flow of the hydraulic fluid, it can be seen that with all three valves 78, 83 and 86 directing full flow to the power line 81a, b and c, that all the fluid will flow through the motor 66, thence through the line 88, into the live roller 30 and back to the fluid reservoir 76. Any one of the three valves is able to divert all the fluid from the power line to the by-pass line portions 82a, b or c so as to halt the motor 66. The flow through this by-pass line is also directed through the roller 30, and since the flow from the pump 75 is constant, there is thus a continuous and uninterrupted fluid flow through this roller 30, regardless of whether the conveyor is moving or not.

The effect of so passing the fluid through the live roller 30 is to keep the surface temperature of the roller sufficiently high to melt from the conveyor ice that has accumulated thereon and thus insure a proper frictional engagement between the roller and the wire mesh conveyor. Since the temperature in the tunnel is generally from −5° to −15° Fahrenheit, and the upper conveyor run 13, as it leaves the tunnel, is very close to this temperature, it is generally necessary to heat the fluid in the reservoir 76 to maintain the fluid temperature at a sufficiently high level to accomplish the de-icing of the conveyor in a proper manner.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In a freezing tunnel for comestibles and the like, an apparatus comprising a conveyor to carry said comestibles through a freezing zone of said tunnel, a roller over which said conveyor trains, a hydraulic motor to effect a travel of said conveyor, a hydraulic power source to drive said motor by means of a fluid medium, and means to direct at least a portion of said fluid medium from said source through said roller and back to said source thus heating said roller so as to limit the icing of said apparatus.

2. In a freezing tunnel for comestibles and the like, an apparatus comprising a conveyor to carry said comestibles through a freezing zone of said tunnel, a mechanism to train said conveyor and to effect a travel thereof, a hydraulic motor to drive said mechanism, a hydraulic power source to drive said motor by means of a fluid medium, means to direct at least a portion of said fluid medium from said source through at least a portion of said mechanism and back to said source so as to limit the icing of said apparatus.

3. In a freezing tunnel for comestibles and the like, an apparatus comprising a conveyor to carry said comestibles through a freezing zone of said tunnel, a live roller over which said conveyor trains in frictional engagement therewith, a hydraulic motor to power said roller, a hydraulic power source to drive said motor by means of a fluid medium, means to direct at least a portion of said fluid medium from said source through said roller and back to said source, thus heating said roller so as to accomplish the proper frictional engagement of said roller with said conveyor.

4. In a freezing tunnel for comestibles and the like, a foraminous conveyor to carry said comestibles through said tunnel, refrigerating means in said tunnel, means to circulate a gaseous medium through said refrigerating means and upwardly through said conveyor, thus freezing said comestibles and creating a suspending action with respect to said comestibles, a mechanism to train said conveyor and to effect a travel thereof, a hydraulic motor to drive said mechanism, a hydraulic power source to drive said motor by means of a fluid medium, means to direct at least a portion of said fluid medium from said source through at least a portion of said mechanism and back to said source so as to limit the icing of said apparatus.

5. In a freezing tunnel for comestibles and the like, foraminous conveyor to carry said comestibles through said tunnel, refrigerating means in said tunnel, means to circulate a gaseous medium through said refrigerating means and upwardly through said conveyor, thus freezing said comestibles and creating a suspending action with respect to said comestibles, a live roller over which said conveyor trains in frictional engagement therewith, a hydraulic motor to power said roller, a hydraulic power source to drive said motor by means of a fluid medium, and means to direct at least a portion of said fluid medium through said roller, thus heating said roller so as to accomplish the proper frictional engagement of said roller with said conveyor.

6. The apparatus as recited in claim 5, wherein there is a conveyor tensioning means comprising two guide rollers and a resiliently mounted tension roller, said conveyor training around one of said guide rollers, thence around said tension roller, and then around the other of said guide rollers, said tension roller being urged away from said guide rollers so as to insure a proper frictional engagement of the conveyor over said live roller.

7. The apparatus as recited in claim 6, wherein there are two parallel ratchets mounted along opposite sides of said tension roller, a shaft having two pinion gears concentric therewith and rigidly attached thereto, each gear engaging a related one of the two ratchets, said tension roller being journal mounted on said shaft, said tension roller thus being able to travel along the length of said ratchets, with each side of said roller thus traveling equal distances therealong.

8. In a freezing tunnel for comestibles and the like, an apparatus comprising a conveyor to carry said comestibles through a freezing zone of said tunnel, a mechanism to train said conveyor and to effect a travel thereof, a hydraulic motor to drive said mechanism, a hydraulic power source to drive said motor by means of a fluid medium, a power line and a by-pass line, both lines being operatively connected to said hydraulic power source so as to be able to receive fluid flow therefrom, valve means at one location to control flow at least through said power line, the fluid from said by-pass line flowing through at least a portion of said mechanism, second valve means at a second location controlling flow through said power line, by-pass means operatively connected to said second valve means to carry fluid to said mechanism, said power line directing fluid to drive said motor and thence to flow through said mechanism, said fluid thus acting to limit the icing of said apparatus and return line means for said fluid from said mechanism and from said hydraulic motor to said power source.

9. In a freezing tunnel for comestibles and the like, an apparatus comprising a conveyor to carry said comestibles through a freezing zone of said tunnel, a mechanism to train said conveyor and to effect a travel thereof, a hydraulic motor to drive said mechanism, a hydraulic power source to drive said motor by means of a fluid medium, a power line and a by-pass line, both lines being operatively connected to said hydraulic power source so as to be able to receive fluid flow therefrom, valve means to direct fluid from said power source in a desired ratio to said power line and to said by-pass line, said power line directing fluid to drive said motor which fluid then flows through said mechanism, said by-pass line also directing fluid to flow through said mechanism, with the result that regardless of the manner in which fluid is apportioned to the power line or to the by-pass line, there is a fluid flow through said mechanism, which thus serves to limit the icing of said apparatus and return line means for said fluid from said mechanism and from said hydraulic motor to said power source.

10. In a freezing tunnel for comestibles and the like, an apparatus comprising a conveyor to carry said comestibles through a freezing zone of said tunnel, a mechanism to train said conveyor and to effect a travel thereof, a hydraulic motor to drive said mechanism, a hydraulic power source to drive said motor by means of a fluid medium, a power line and a by-pass line, both lines being operatively connected to said hydraulic power source so as to be able to receive fluid flow therefrom, valve means to direct fluid from said power source in a desired ratio to said power line and to said by-pass line, said power line directing fluid to drive said motor which fluid then flows through said mechanism, said by-pass line also directing fluid to flow through said mechanism, second valve means at a second location adapted to control fluid flow through said power line by diverting a desired portion of said fluid from said power line to by-pass means leading to said mechanism, with the result that regardless of the manner in which fluid flow to said motor is controlled by either valve means, there is a fluid flow through said mechanism, which thus serves to limit the icing of said apparatus and return line means for said fluid from said mechanism and from said hydraulic motor to said power source.

11. In a freezing tunnel for comestibles and the like, a foraminous conveyor having an upper and a lower run, said upper run being adapted to carry comestibles through a freezing zone of said tunnel, said conveyor extending longitudinally along one side of said tunnel, a plurality of refrigerating coils located along the length of said freezing zone on the side of the tunnel opposite that occupied by said conveyor, means to circulate the air in the tunnel on a course downwardly through said coils and thence upwardly through said conveyor so as to suspend and freeze said comestibles, confining means along each side of said conveyor to direct said air through said lower and upper conveyor runs, said tunnel interior being of generally rectangular section with said conveyor being spaced a substantial distance from the base of said tunnel so as to create below said conveyor an area where the air from said coils has a reduction in velocity and an increase in pressure, which in turn produces a relatively uniform and non-turbulent air flow directed upwardly through said conveyor.

12. In a freezing tunnel for comestibles and the like, a foraminous conveyor having an upper and a lower run, said upper run being adapted to carry comestibles through a freezing zone of said tunnel, said conveyor extending longitudinally along one side of said tunnel, a plurality of refrigerating coils located along the length of said freezing zone on the side of the tunnel opposite that occupied by said conveyor, a partition separating said coils and said conveyor, said partition having a lower opening to allow air to pass from beneath said coils to beneath said conveyor, upper opening means in said partition, fan means to circulate air through said upper opening means and downwardly through said coils and upwardly through said conveyor so as to suspend and freeze said comestibles, confining means along each side of said conveyor to direct said air through said lower and upper conveyor runs, said tunnel interior being of generally rectangular section with said conveyor being spaced a substantial distance from the base of said tunnel so as to create below said conveyor an area where the air from said coils has a reduction in velocity and an increase of pressure, which in turn produces a relatively uniform and non-turbulent air flow directed upwardly through said conveyor.

References Cited in the file of this patent

UNITED STATES PATENTS

| | | |
|---|---|---|
| 399,012 | Briggs | Mar. 5, 1889 |
| 2,215,964 | Knowles | Sept. 24, 1940 |
| 2,223,972 | Sterling | Dec. 3, 1940 |
| 2,237,256 | Finnegan | Apr. 1, 1941 |
| 2,402,921 | Sharpe | June 25, 1946 |